(12) United States Patent
Suzuki et al.

(10) Patent No.: US 11,557,418 B2
(45) Date of Patent: Jan. 17, 2023

(54) COIL COMPONENT AND ELECTRONIC DEVICE

(71) Applicant: TAIYO YUDEN CO., LTD., Tokyo (JP)

(72) Inventors: Hideharu Suzuki, Takasaki (JP); Kazuhiro Takahashi, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 736 days.

(21) Appl. No.: 16/572,311

(22) Filed: Sep. 16, 2019

(65) Prior Publication Data
US 2020/0105452 A1  Apr. 2, 2020

(30) Foreign Application Priority Data
Sep. 28, 2018 (JP) .............................. JP2018-185571

(51) Int. Cl.
*H01F 17/04* (2006.01)
*H01F 27/02* (2006.01)
(Continued)

(52) U.S. Cl.
CPC ............. *H01F 17/045* (2013.01); *H01F 1/12* (2013.01); *H01F 27/02* (2013.01); *H01F 27/263* (2013.01);
(Continued)

(58) Field of Classification Search
CPC ...... H01F 17/045; H01F 27/02; H01F 27/263; H01F 27/266; H01F 27/292
See application file for complete search history.

(56) References Cited

U.S. PATENT DOCUMENTS

| 2003/0179062 A1* | 9/2003 | Kuwata | H01F 17/045 336/83 |
| 2004/0108928 A1* | 6/2004 | Chou | H01F 17/045 336/83 |

(Continued)

FOREIGN PATENT DOCUMENTS

| JP | 2011165706 A | 8/2011 |
| JP | 2012178532 A | 9/2012 |

(Continued)

OTHER PUBLICATIONS

A Notice of Reasons for Refusal issued by the Japanese Patent Office, dated May 10, 2022, for Japanese counterpar application No. 2018-185571. (3 pages).

*Primary Examiner* — Elvin G Enad
*Assistant Examiner* — Malcolm Barnes
(74) *Attorney, Agent, or Firm* — Law Office of Katsuhiro Arai

(57) ABSTRACT

A coil component includes: a core part including: a winding shaft; and a planar flange part provided at an axial-direction end of the winding shaft, and having a groove part provided on an exterior face thereof where a lead part led out from a conductor wound around the winding shaft into the groove part, wherein the flange part has a first recessed part provided on a first side face intersecting with the long axis of the groove part and communicated with the groove part, wherein the area of a cross section, taken in a direction parallel with the first side face, of the first recessed part, is greater than the area of a cross section, taken in a direction parallel with the first side face.

16 Claims, 13 Drawing Sheets

(51) Int. Cl.
*H01F 27/26* (2006.01)
*H01F 27/29* (2006.01)
*H01F 1/12* (2006.01)
*H02K 5/04* (2006.01)
*H01F 27/28* (2006.01)

(52) U.S. Cl.
CPC ....... *H01F 27/266* (2013.01); *H01F 27/2823* (2013.01); *H01F 27/292* (2013.01); *H02K 5/04* (2013.01)

(56) References Cited

U.S. PATENT DOCUMENTS

| | | | | |
|---|---|---|---|---|
| 2005/0212643 | A1* | 9/2005 | Kuroiwa | H01F 27/292 336/200 |
| 2006/0284716 | A1* | 12/2006 | Yamaguchi | H01F 17/045 336/221 |
| 2007/0188281 | A1* | 8/2007 | Iguchi | H01F 17/045 335/299 |
| 2013/0099884 | A1* | 4/2013 | Liang | H01F 27/292 336/83 |
| 2013/0186995 | A1* | 7/2013 | Yamaguchi | H01F 17/045 242/432.6 |
| 2013/0194060 | A1* | 8/2013 | Nakada | H01F 17/045 336/192 |
| 2016/0086725 | A1* | 3/2016 | Igarashi | H01F 27/2823 336/83 |
| 2018/0308629 | A1* | 10/2018 | Shinohara | H01F 27/24 |
| 2019/0295760 | A1* | 9/2019 | Xia | H01F 41/0206 |

FOREIGN PATENT DOCUMENTS

| | | | | |
|---|---|---|---|---|
| JP | 2013033871 A | | 2/2013 | |
| JP | 2014027029 A | * | 2/2014 | ......... H01F 17/0006 |
| JP | 2014027029 A | | 2/2014 | |
| JP | 2014049528 A | | 3/2014 | |

\* cited by examiner

COIL COMPONENT AND ELECTRONIC DEVICE

CROSS-REFERENCE TO RELATED APPLICATIONS

The present application claims priority to Japanese Patent Application No. 2018-185571, filed Sep. 28, 2018, the disclosure of which is incorporated herein by reference in its entirety including any and all particular combinations of the features disclosed therein.

BACKGROUND

Field of the Invention

The present invention relates to a coil component and an electronic device.

Description of the Related Art

Coil components, which are constituted in such a way that a conductive wire is wound around the winding shaft of a drum core and then led out into grooves provided on the exterior face of a flange part, after which the end portions of the conductive wire that have been led out into the grooves are solder-bonded to metal films provided in the grooves to form electrodes, are known. For example, methods for achieving a stable solder connection between the conductive wire and the metal film are known, which involve dipping the flange part in a solder bath and then pulling the drum core out of the solder bath while turning the drum core at a prescribed speed in such a way that the extending direction of the grooves aligns with the tangential direction (refer to Patent Literature 1, for example).

Background Art Literatures

[Patent Literature 1] Japanese Patent Laid-open No. 2011-165706

SUMMARY

The present invention is a coil component comprising: a core part including: a winding shaft; and a flange part provided in the shape of a plate at an axial-direction end of the winding shaft, which has an exterior face on the opposite side of the winding shaft, a groove part provided on the exterior face, a first side face intersecting with the long axis of the groove part, and a first recessed part provided on the first side face; a coil part including: a winding part constituted by winding a conductor having an insulating film; and a lead part, which is a portion of the conductor that has been led out from the winding part, along the first side face of the flange part, into the groove part of the flange part; and a terminal part provided in the groove part of the flange part away from the first side face, which includes an end portion of the lead part where the insulating film has been stripped and a soldered portion; wherein the cross-section area of a section, running parallel with the first side face, of the space part formed on the first side face as the first recessed part, is greater than the cross-section area of a section, running parallel with the first side face, of the groove part contacting the terminal part.

The present invention is an electronic device comprising: the aforementioned coil component; and a circuit board on which the coil component has been mounted.

BRIEF DESCRIPTION OF THE DRAWINGS

FIG. 1A is a perspective view of the coil component pertaining to Example 1, while

FIG. 5A is a perspective view of the coil component pertaining to the Comparative Example, while

DESCRIPTION OF THE SYMBOLS

Figure 1A:
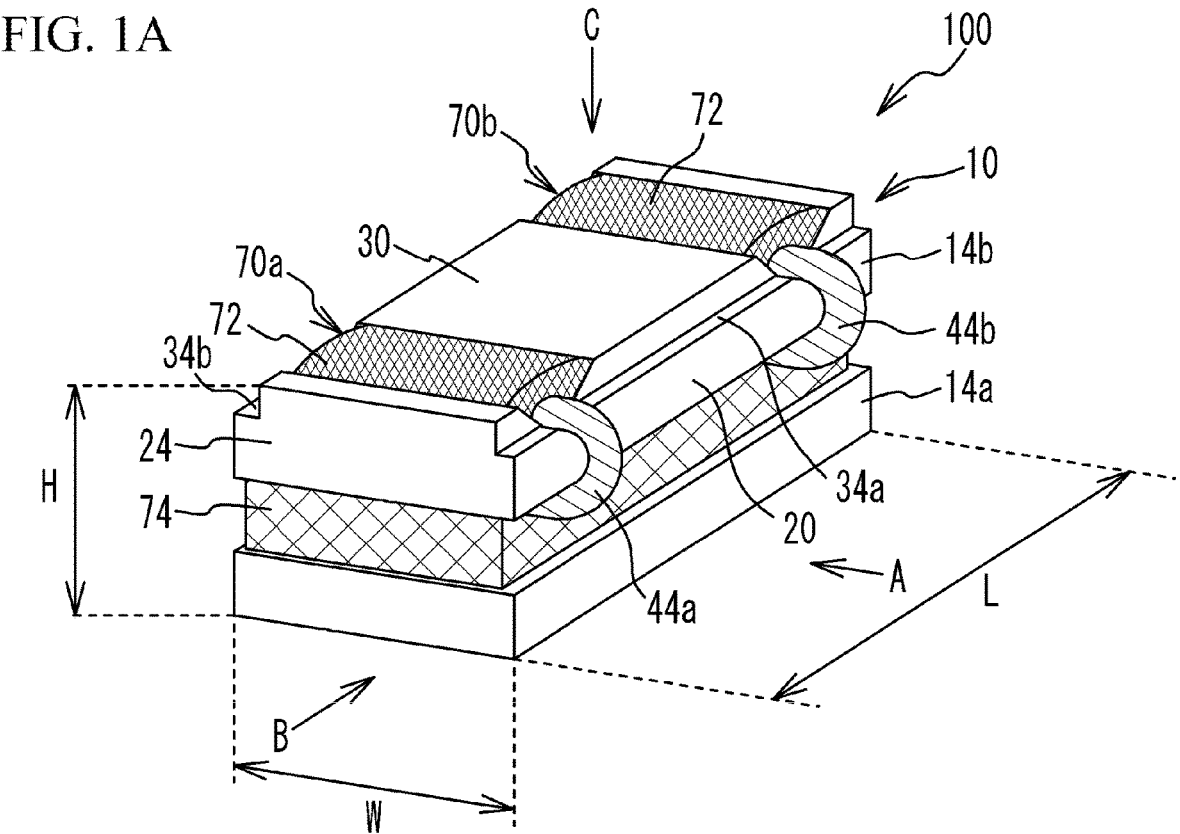

10 Drum core
12 Winding shaft
14a, 14b Flange part
20, 22, 24, 26 Side face
28 Interior face
30 Exterior face
32a, 32b Groove part
34a, 34b Recessed part
35 Bottom face
36a, 36b Recessed part
37 Beveled face
38, 38a Recessed part
40 Coil part
42 Winding part
44a, 44b Lead part
46 Conductive wire
48 Insulating film
50 Metal wire
60a, 60b Metal film
70a, 70b Terminal part
72 Solder
74 Resin film
80 Circuit board
82 Electrode
90 Drum core
92 Winding shaft 94a, 94b Flange part
100, 1000 Coil component
800 Electronic device

DETAILED DESCRIPTION OF EMBODIMENTS

Examples of the present invention are explained below by referring to the drawings.

Example 1

Figure 1B:
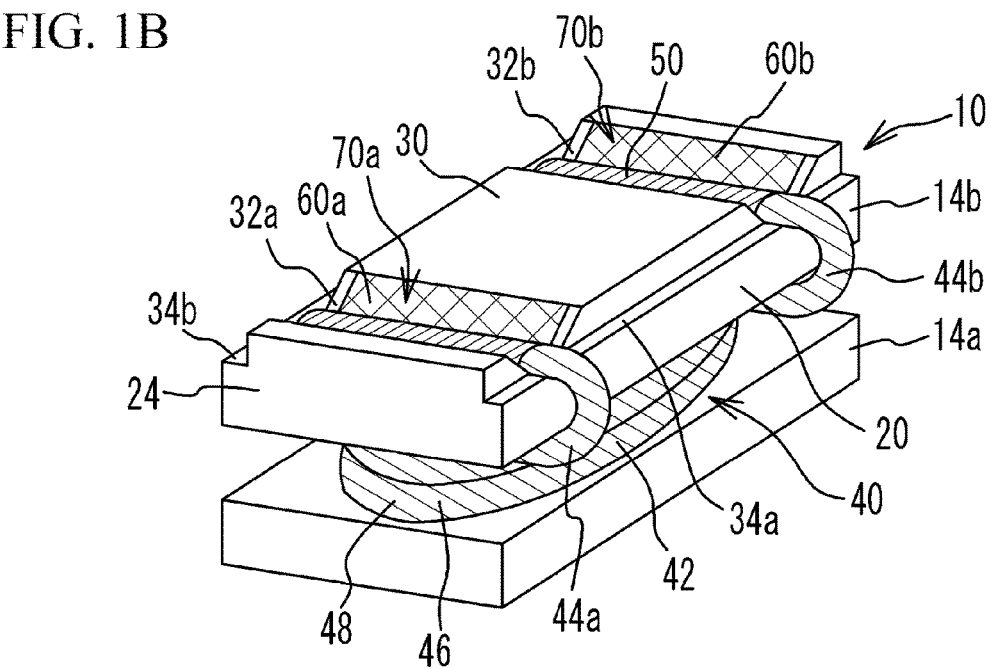
FIG. 1B is a perspective view without the resin film and solder (making them invisible) in FIG. 1A.

FIG. 1A is a perspective view of the coil component pertaining to Example 1, while FIG. 1B is a perspective view without the resin film and solder (making them invisible) in FIG. 1A. As shown in FIGS. 1A and 1B, the coil component 100 in Example 1 comprises a drum core 10, a coil part 40, and terminal parts 70a, 70b.

Figure 2A:
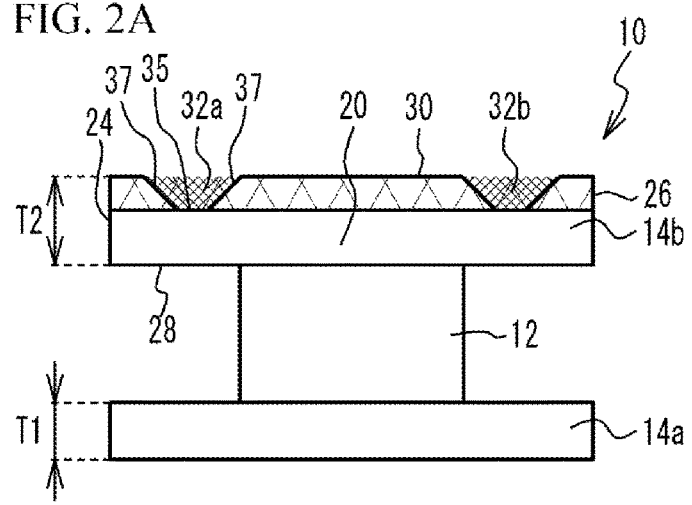
FIGS. 2A to 2C are drawings showing the drum core in Example 1.
Figure 2B:
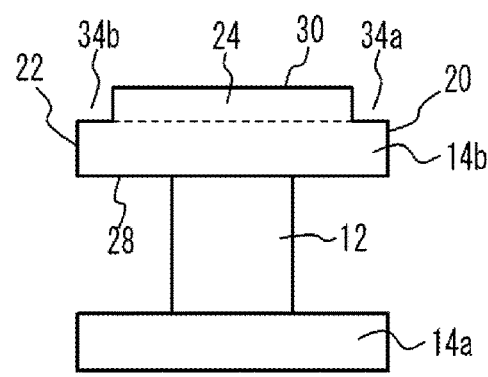
Figure 2C:
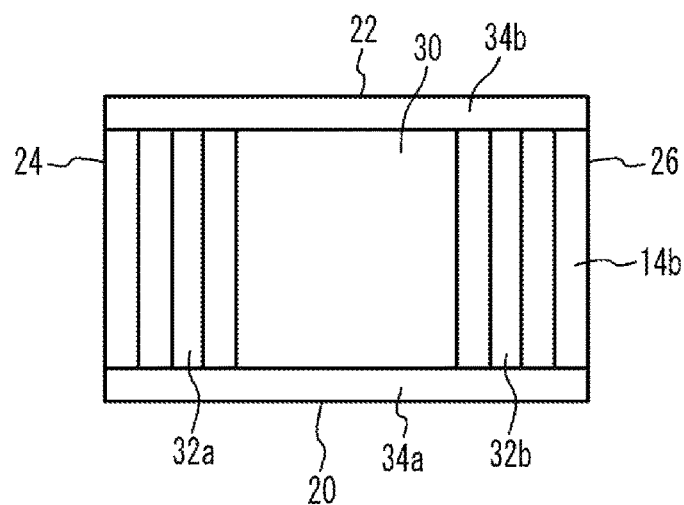

FIGS. 2A to 2C are drawings showing the drum core in Example 1. FIG. 2A is a side view of the drum core 10 as seen from the direction of A in FIG. 1A, FIG. 2B is a side view of the drum core 10 as seen from the direction of B in FIG. 1A, and FIG. 2C is a top view of the drum core 10 as seen from the direction of C in FIG. 1A. As shown in FIGS. 2A to 2C, the drum core 10 includes a winding shaft 12, and plate-shaped flange parts 14a, 14b provided at both axial-direction ends of the winding shaft 12. The thickness dimension T1 of the flange part 14a is 0.15 mm to 0.55 mm. The thickness dimension T2 of the flange part 14b is 0.2 mm to 0.7 mm. The thickness dimension T2 of the flange part 14b is no smaller than the thickness dimension T1 of the flange part 14a. The winding shaft 12 has a columnar shape whose bottom face has a profile formed by straight lines connecting two arcs, for example. The flange part 14a has a rectangular solid shape.

The flange part 14b has four side faces, including a side face 20, a side face 22 positioned on the opposite side of the side face 20 across the winding shaft 12, a side face 24 adjoining the side faces 20, 22, and a side face 26 positioned on the opposite side of the side face 24 across the winding shaft 12. Also, the flange part 14b has an interior face 28 to which the winding shaft 12 is connected, and an exterior face 30 on the opposite side of the interior face 28 to which the winding shaft 12 is connected. Groove parts 32a, 32b are provided on the exterior face 30 of the flange part 14b. The groove parts 32a, 32b extend in a direction intersecting the side faces 20, 22. In other words, the side faces 20, 22 are side faces intersecting the long axes of the groove parts 32a, 32b. In one example, the groove parts 32a, 32b have a beveled shape whose width decreases toward a bottom face 35. This means that the groove parts 32a, 32b each have the bottom face 35 and two beveled faces 37 that allow the width of the groove part 32a or 32b to decrease toward the bottom face 35. The groove parts 32a, 32b can have any shape so long as it forms a groove, such as one constituted by a bottom face 35 and side faces that extend from the bottom face 35 in a direction perpendicular to the bottom face 35, and also, a bottom face 35 and/or side faces may be curved.

In one example, the depth dimension of the groove parts 32a, 32b is 0.1 mm to 0.3 mm, being no greater than one-half the thickness dimension of the flange part 14b. The deeper the groove parts 32a, 32b, the thinner the flange part 14b becomes, which causes the strength to drop; accordingly, the depth dimension of the groove parts 32a, 32b is preferably no greater than one-third, or more preferably no greater than one-fourth, the thickness dimension of the flange part 14b. The width dimensions of the groove parts 32a, 32b on their open portion side and bottom face side are roughly constant from one ends to the other ends of the groove parts 32a, 32b in their length direction, or specifically 0.2 mm to 2.5 mm on the open portion side and 0.1 mm to 1.0 mm on the bottom face side.

Recessed parts 34a, 34b are provided on the side faces 20, 22 of the flange part 14b where the side faces 20, 22 adjoin the exterior face 30. The recessed parts 34a, 34b extend from one, to the other, of the pair of side faces 24, 26 of the flange part 14b. In other words, the recessed parts 34a, 34b are provided in a manner contacting the side faces 24, 26. The depth dimension of the recessed parts 34a, 34b in the axial direction of the winding shaft 12 is roughly the same as the depth dimension of the groove parts 32a, 32b in the axial direction of the winding shaft 12, for example. It should be noted that "roughly the same" includes differences of manufacturing error or so.

The drum core 10 is formed in a manner containing a magnetic material. For example, the drum core 10 is formed in a manner containing Ni—Zn, Mn—Zn or other ferrite material, Fe—Si—Cr, Fe—Si—Al, Fe—Si—Cr—Al, or other soft magnetic alloy material, Fe, Ni, or other magnetic metal material, amorphous magnetic metal material, or nanocrystal magnetic metal material. If it is to be formed using a ferrite material, the drum core 10 may be formed by sintering the ferrite material. If it is to be formed using metal magnetic grains, the drum core 10 may be formed by solidifying the metal magnetic grains with a resin, or it may be formed by causing the insulating films formed on the surfaces of the metal magnetic grains to bond together.

As shown in FIGS. 1A and 1B, the coil component 40 includes a winding part 42 constituted by winding a conductive wire 46 having an insulating film 48, and lead parts 44a, 44b that are portions of the conductive wire 46 led out from the winding part 42. The conductive wire 46 has a diameter of 0.05 mm or greater and a conductor cross-section area of 0.00196 $mm^2$ or greater but no greater than 0.0236 $mm^2$, and the surface of a metal wire 50 constituting the conductor is covered with the insulating film 48. The metal wire 50 covered with the insulating film 48 is formed by copper, silver, palladium, silver-palladium alloy, etc., for example. The insulating film 48 is formed by polyester imide, polyamide, etc., for example.

The lead parts 44a, 44b are led out by being bent along the side face 20 of the flange part 14b, after which they are bent further along the exterior face 30 of the flange part 14b to be led into the groove parts 32a, 32b provided on the exterior face 30 of the flange part 14b. At the end portions, which are portions of the lead parts 44a, 44b inserted into the groove parts 32a, 32b, the insulating film 48 is stripped and the metal wire 50 is exposed. Preferably the depth dimension of the groove parts 32a, 32b is greater than the diameter of the conductive wire 46 so that the conductive wire 46 fits into the groove parts 32a, 32b. The width dimension of the groove parts 32a, 32b on their bottom face side is preferably greater than 1.0 times, or more preferably greater than 1.2 times, or yet more preferably greater than 1.4 times, the diameter of the conductive wire 46.

Metal films 60a, 60b are provided in the groove parts 32a, 32b. The metal films 60a, 60b are provided in a manner covering the beveled faces 37 and bottom faces 35 of the groove parts 32a, 32b. The metal films 60a, 60b are each formed by laminated metal layers that include, for example, a base layer of copper, silver, palladium, silver-palladium alloy, etc., and a plating layer comprising nickel and tin layers provided on top.

The end portions of the lead parts 44a, 44b where the metal wire 50 is exposed, are joined by a solder 72 to the metal films 60a, 60b provided in the groove parts 32a, 32b. This way, terminal parts 70a, 70b are formed. To be specific, the terminal parts 70a, 70b are formed by the end portions of the lead parts 44a, 44b where the metal wire 50 is exposed, the solder 72, and the metal films 60a, 60b. The solder 72 is filled into the groove parts 32a, 32b and does not bleed out of the groove parts 32a, 32b. This is because the solder 72 wets and spreads over the metal films 60a, 60b having good solder wettability, but it does not easily wet and spread over the drum core 10 having poor solder wettability. The solder 72 is flush with the exterior face 30 of the flange part 14b, or formed so that it is raised slightly from the exterior face 30.

The recessed parts 34a, 34b provided on the side faces 20, 22 of the flange part 14b are on the exterior face 30 sides of the side faces 20, 22 and contacting the groove parts 32a, 32b. This way, spaces (corresponding to coarsely-hatched areas plus finely-hatched areas in FIG. 2A) whose cross-section area is greater than the cross-section area (corresponding to the finely-hatched areas in FIG. 2A) of the groove parts 32a, 32b contacting the terminal parts 70a, 70b, are formed between the terminal parts 70a, 70b and the side faces 20, 22 of the flange part 14b. To be specific, the cross-section area of the space part formed on the side face 20 as the recessed part 34a, i.e., the area of a cross section of the space part taken in a direction parallel with the side face 20 (e.g., an average or representative area of multiple cross sections, an area of a randomly selected cross section, a maximum area of entire cross sections, or an area of a cross section taken at the side face 20), becomes greater than the cross-section area of the groove parts 32a, 32b contacting the terminal parts 70a, 70b, i.e., the area of a cross section of each groove part taken in a direction parallel with the side face 20 (e.g., an average or representative area of multiple cross sections, an area of a randomly selected cross section, a maximum area of entire cross sections, or an area of a cross section taken at a boundary between the groove part and the space part). Similarly, the cross-section area of a section, running parallel with the side face 22, of the space part formed on the side face 22 as the recessed part 34b, becomes greater than the cross-section area of a section, running parallel with the side face 22, of the groove parts 32a, 32b contacting the terminal parts 70a, 70b.

A resin film 74 is provided between the flange parts 14a, 14b in a manner covering the winding part 42 of the coil part 40. In the interest of making the component smaller, preferably the resin film 74 fits between the flange parts 14a, 14b and does not project outwardly beyond the flange parts 14a, 14b. The resin film 74 is formed by a resin that contains ferrite grains or metal magnetic grains (such as epoxy resin or other insulating resin, for example). It should be noted that the resin film 74 may not be provided.

The coil component 100 has a height H of 0.8 mm to 4.5 mm, a length L of 1.6 mm to 7.0 mm, and a width W of 0.8 mm to 7.0 mm. It should be noted that the aforementioned height H is a value including the projected portion of the solder 72, and the height excluding the solder 72 is 0.75 mm to 4.3 mm. The thickness of the metal films 60a, 60b is 0.05 mm to 0.2 mm.

Figure 3A:
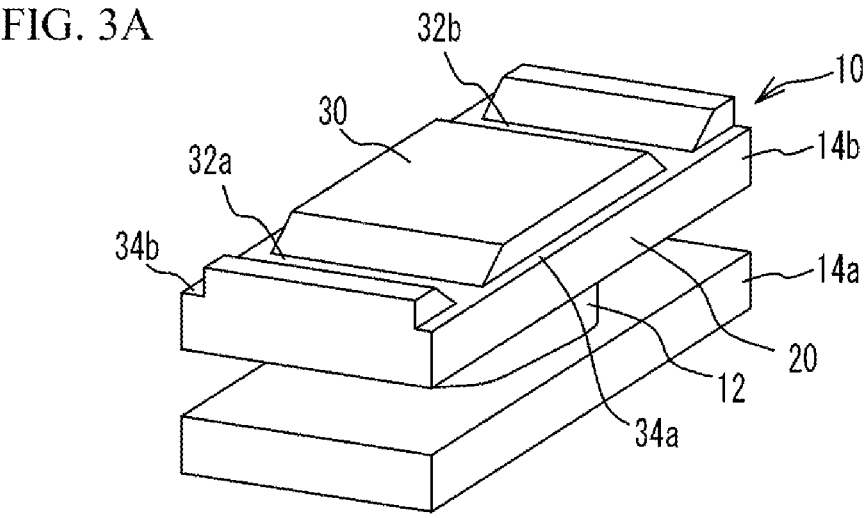
FIGS. 3A to 3C are perspective views (1) showing how the coil component pertaining to Example 1 is manufactured.

FIGS. 3A to 4B are perspective views showing how the coil component pertaining to Example 1 is manufactured. As shown in FIG. 3A, a composite magnetic material prepared by mixing magnetic grains with a resin is filled into a die and compression-molded to form a drum core 10 having a winding shaft 12 and flange parts 14a, 14b provided at both ends of the winding shaft 12. The flange part 14b has groove parts 32a, 32b and recessed parts 34a, 34b formed on it. It should be noted that the groove parts 32a, 32b and recessed parts 34a, 34b may be formed by a grinding process after the molding.

Figure 3B:
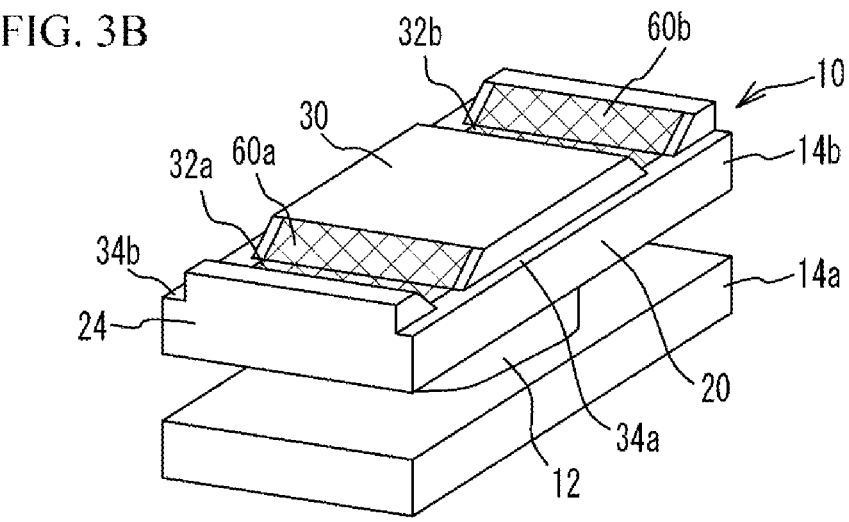

As shown in FIG. 3B, metal films 60a, 60b are formed in the groove parts 32a, 32b of the flange part 14b by, for example, forming base layers using the sputtering method and then forming plating layers on top of the base layers using the plating method. It should be noted that the base layers may be formed by applying a conductive paste.

Figure 3C:
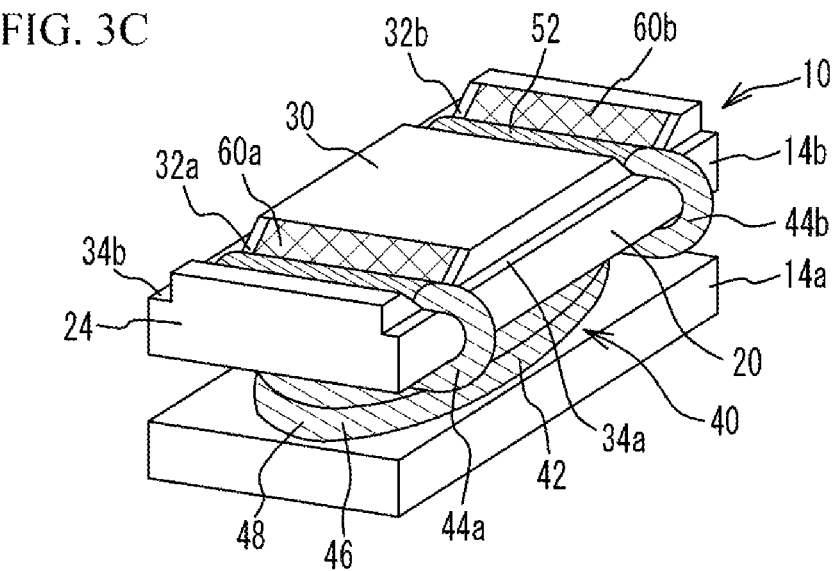

As shown in FIG. 3C, a conductive wire 46 covered with an insulating film 48 is wound around the winding shaft 12 of the drum core 10, while both end portions of the conductive wire 46 are bent, to form a coil part 40 that includes a winding part 42 being wound around the winding shaft 12 as well as lead parts 44a, 44b that have been led out from the winding part 42 into the groove parts 32a, 32b of the flange part 14b. It should be noted that the coil part 40 may be prepared separately and assembled with the drum core 10, before the bending and other processes are performed. A flux 52 is applied to the end portions of the lead parts 44a, 44b positioned inside the groove parts 32a, 32b.

Figure 4A:
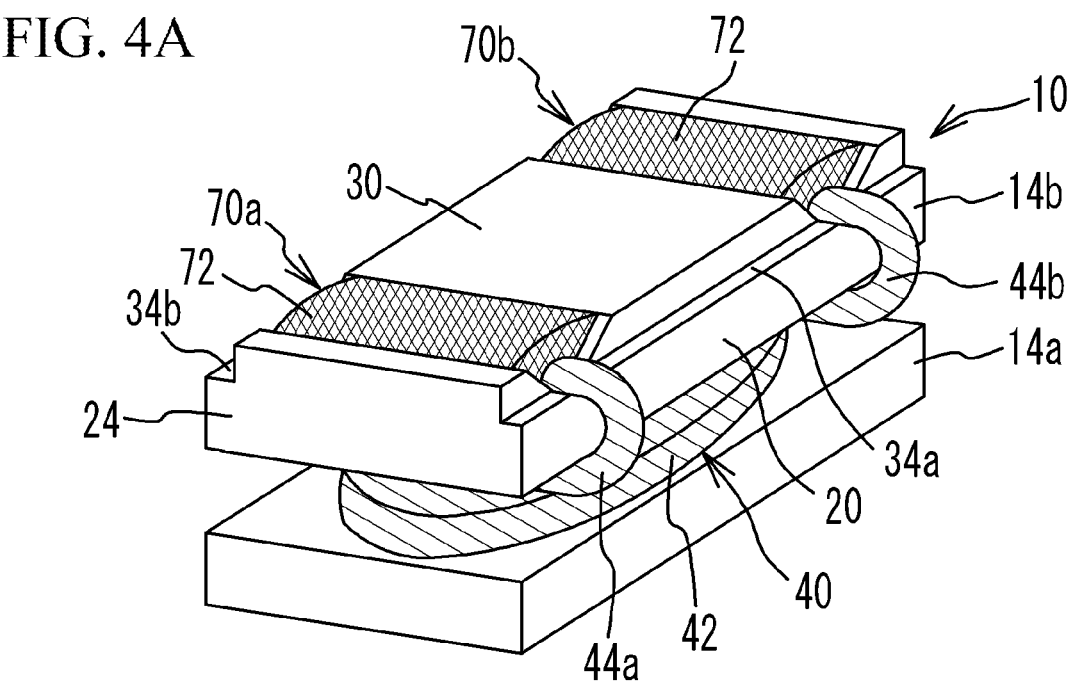
FIGS. 4A and 4B are perspective views (2) showing how the coil component pertaining to Example 1 is manufactured.

As shown in FIG. 4A, the end portions of the lead parts 44a, 44b to which the flux 52 has been applied are heated together with a solder, and the resulting portions where the insulating film 48 has been stripped by the action of the flux 52 and the metal wire 50 is exposed are joined to the metal films 60a, 60b using a solder 72. This way, terminal parts 70a, 70b are formed. The solder 72 wets and spreads over the metal films 60a, 60b to fill the groove parts 32a, 32b. The solder 72 does not easily wet and spread over the drum core 10 having poor solder wettability, and thus does not easily spread out of the groove parts 32a, 32b. The lead parts 44a, 44b may be joined to the metal films 60a, 60b using solders 72 that have been formed on the metal films 60a, 60b beforehand by heating the end portions to which the flux 52 has been applied, or they may be joined to the metal films 60a, 60b by leading out into the grooves 32a, 32b the end portions to which the flux 52 has been applied and then dipping the entire flange part 14b into a solder bath.

Figure 4B:
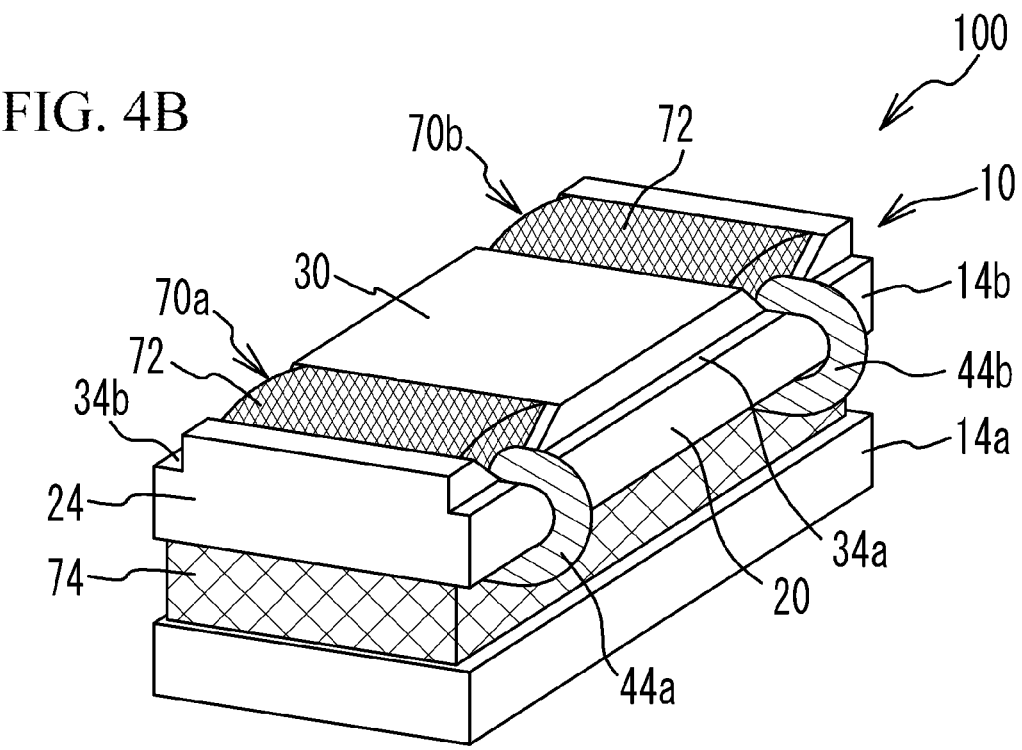

As shown in FIG. 4B, a composite magnetic material prepared by mixing magnetic grains with a resin is applied to the exterior side of the winding part 42 between the flange parts 14a, 14b, after which the resin is cured to form a resin film 74.

Figure 5A:
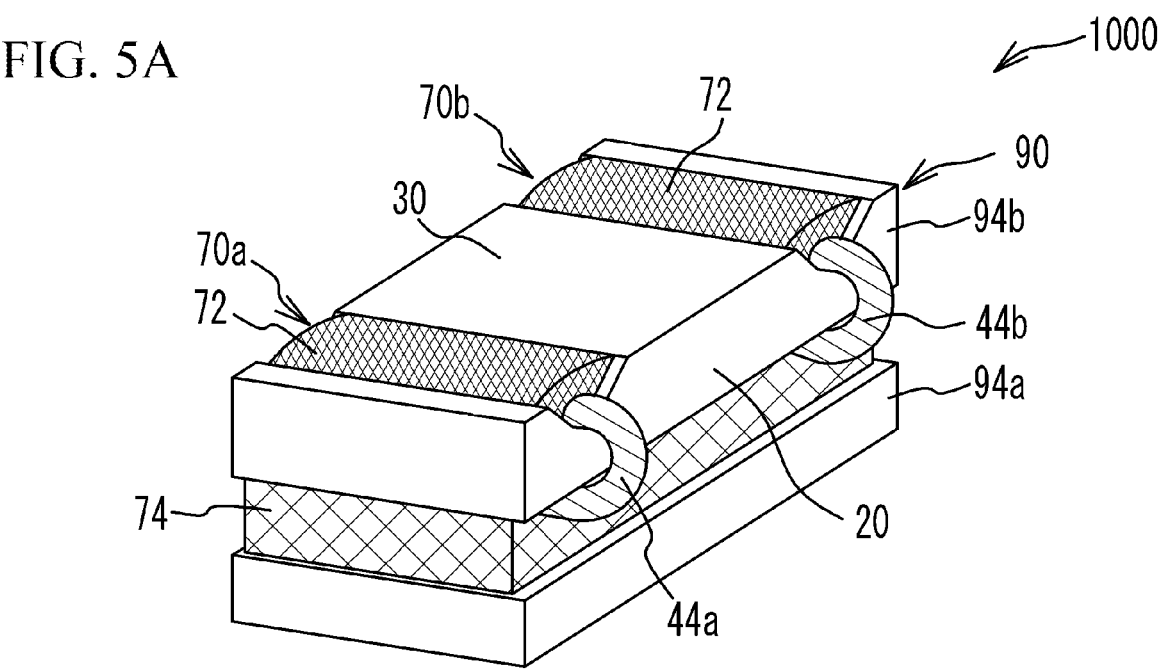
Figure 5B:
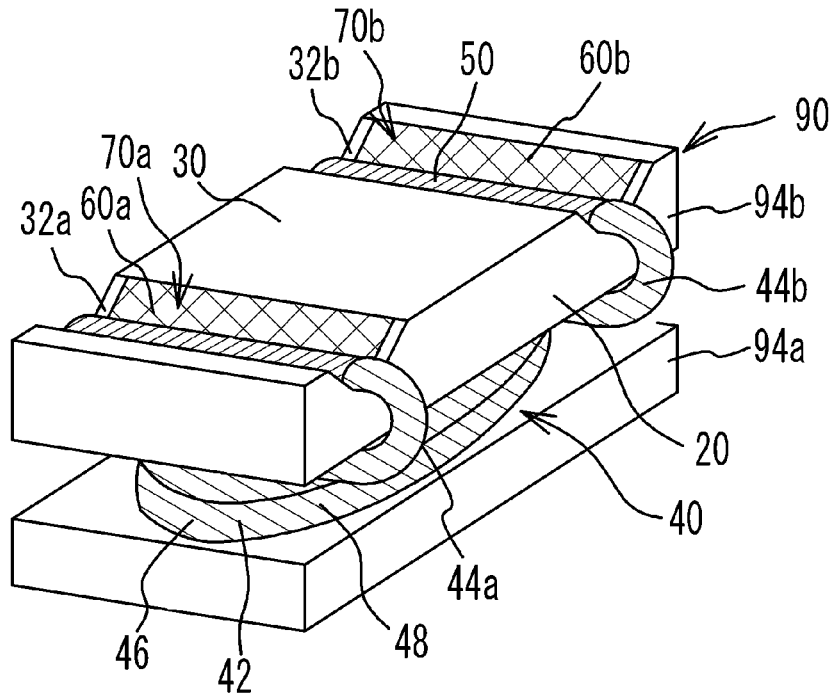
FIG. 5B is a perspective view showing through the solder and resin film in FIG. 5A.
Figure 6A:
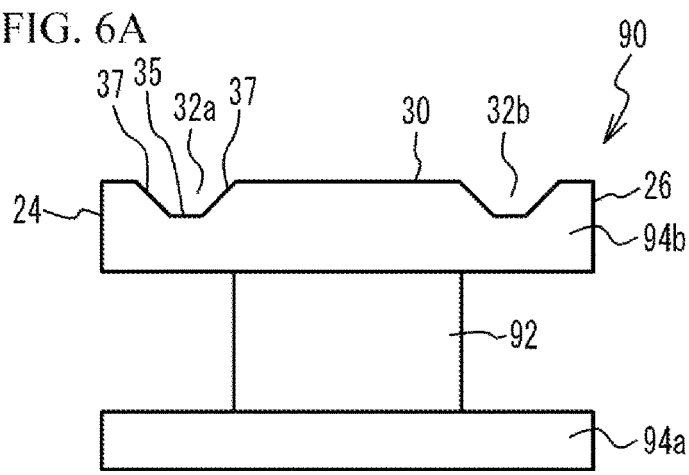
FIGS. 6A to 6C are drawings showing the drum core in the Comparative Example.
Figure 6B:
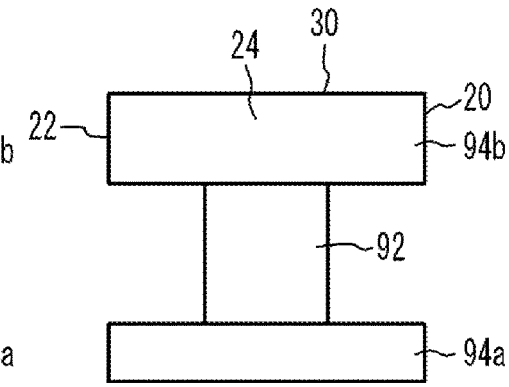
Figure 6C:
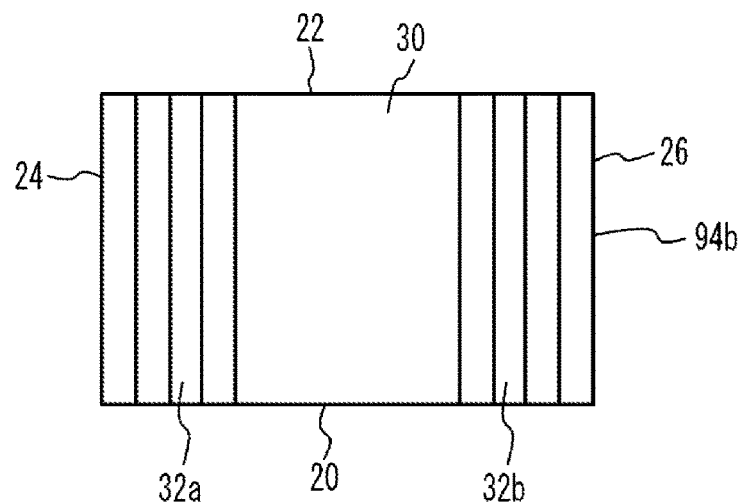

FIG. 5A is a perspective view of the coil component pertaining to the Comparative Example, while FIG. 5B is a perspective view without the resin film and solder (making them invisible) in FIG. 5A. FIGS. 6A to 6C are drawings showing the drum core in the Comparative Example. As shown in FIGS. 5A and 5B, and in FIGS. 6A to 6C, the coil component 1000 in the Comparative Example uses a drum core 90 having a winding shaft 92 and flange parts 94a, 94b, instead of the drum core 10. The recessed parts 34a, 34b are not formed on the flange part 94b. The groove parts 32a, 32b provided on the exterior face 30 of the flange part 94b extend from the side face 20, to the opposite side face 22, of the flange part 94b. The remaining constitutions are the same as those in Example 1 and therefore not explained.

As explained regarding the manufacturing method in Example 1, a process in which a flux 52 is applied to the end portions of the lead parts 44a, 44b so that the insulating film 48 will be stripped at the time of solder joining, is performed for the purpose of solder-joining the end portions of the lead parts 44a, 44b to the metal films 60a, 60b. If a conductive wire 46 with a large diameter is used for the purpose of supporting large current, the insulating film 48 becomes thicker and therefore the flux 52 is used by a larger quantity. This makes it easy for the liquid flux 52 that has not vaporized under the heat from solder joining and/or liquid flux 52 that has vaporized and then liquefied under cooling, to attach to the conductive wire 46 and/or the interior of the groove parts 32a, 32b. Any residual flux 52 may travel along the lead parts 44a, 44b and migrate to the winding part 42 over time due to moisture in air, for example. As a result, the insulating film 48 may become thinner or removed at the winding part 42, leading to deteriorating properties.

In the Comparative Example, the groove parts 32a, 32b are provided in a manner directly contacting the side faces 20, 22 of the flange part 94b without having any recessed part in between. As a result, the distances between the terminal parts 70a, 70b and the winding part 42 of the coil part 40, via the lead parts 44a, 44b, become shorter. This makes it easy for any residual flux 52 that has attached to the conductive wire 46 and/or the interior of the groove parts 32a, 32b to migrate to the winding part 42, which in turn causes the properties to deteriorate easily.

According to Example 1, on the other hand, the terminal parts 70a, 70b are provided away from the side face 20 of the flange part 14b, as shown in FIGS. 1A, 1B and 2A. Provided on the exterior face 30 side of the side face 20 of the flange part 14b, in a manner contacting the groove parts 32a, 32b, is a recessed part 34a which would form a space whose cross-section area, when compared as the cross-section area of a section parallel with the side face 20, is greater than the cross-section area of the groove parts 32a, 32b contacting the terminal parts 70a, 70b. To be specific, the cross-section area of a section, running parallel with the side face 20, of the space part formed on the side face 20 as the recessed part 34a, becomes greater than the cross-section area of a section, running parallel with the side face 20, of the groove parts 32a, 32b contacting the terminal parts 70a, 70b. This way, the distances between the terminal parts 70a, 70b and the winding part 42 of the coil part 40, via the lead parts 44a, 44b, can be increased. Also, in case any residual flux 52 travels along the lead parts 44a, 44b, such residual flux 52 can be collected in the recessed part 34a. Furthermore, the groove parts 32a, 32b become shorter, and therefore the regions of the lead parts 44a, 44b where the insulating film 48 is stripped become shorter and the use quantity of the flux 52 decreases as a result, which in turn reduces the very production of residual flux 52. For these reasons, any residual flux 52 that has attached to the conductive wire 46 and/or the interior of the groove parts 32a, 32b, is prevented from traveling along the lead parts 44a, 44b and attaching to the winding part 42. As a result, property deterioration over time can be prevented, and therefore drop in reliability can be prevented.

As shown in FIGS. 1A and 1B, preferably the recessed part 34a is such that its width dimension in the direction orthogonal to the axial direction of the winding shaft 12 in a section parallel with the side face 20 of the flange part 14b is greater than the width dimension of the groove parts 32a, 32b in the direction orthogonal to the axial direction of the winding shaft 12 in a section parallel with the side face 20. This way, more residual flux 52 can be collected in the recessed part 34a, so that attachment of residual flux 52 to the winding part 42 can be prevented effectively.

As shown in FIGS. 1A, 1B and 2C, preferably the recessed part 34a is provided in a manner contacting a pair of side faces 24, 26 of the flange part 14b. This way, the volume of the recessed part 34a increases, which allows for collection, in the recessed part 34a, of even more residual flux 52 that has traveled along the lead parts 44a, 44b. As a result, attachment of residual flux 52 to the winding part 42 can be prevented more effectively.

As shown in FIGS. 1A and 1B, preferably the flange part 14b is such that, in addition to the recessed part 34a which is provided on the side face 20, a recessed part 34b is also provided on the side face 22. In other words, provided on the exterior face 30 side of the side face 22 of the flange part 14b, in a manner contacting the groove parts 32a, 32b, is a recessed part 34b which would form a space whose cross-section area, when compared as the cross-section area of a section parallel with the side face 22, is greater than the cross-section area of the groove parts 32a, 32b contacting the terminal parts 70a, 70b. To be specific, the cross-section area of a section, running parallel with the side face 22, of the space part formed on the side face 22 as the recessed part 34b, becomes greater than the cross-section area of a section, running parallel with the side face 22, of the groove parts 32a, 32b contacting the terminal parts 70a, 70b. This way, the lead parts can be led out from the winding part toward the groove parts 32a, 32b in two directions. As a result, the procedure for aligning the direction of the drum core 10 in the lead-out process can be simplified, which leads to improved productivity. Also, coil components having two coils wound around a drum core 10, such as common mode choke coils, for example, can also be supported.

As shown in FIG. 1B, preferably the length direction of the groove parts 32a, 32b represents a direction roughly parallel with the short sides of the exterior face 30 of the flange part 14b, while the width direction of the groove parts 32a, 32b represents a direction roughly parallel with the long sides of the exterior face 30 of the flange part 14b. In other words, the side face 20 of the flange part 14b runs in a direction roughly parallel with the long sides of the exterior face 30. This way, the width of the groove parts 32a, 32b can be increased, and consequently the area of the metal films 60a, 60b can be increased. As a result, peeling of the metal films 60a, 60b from the drum core 10 can be prevented. It should be noted that "roughly parallel" also includes angling by manufacturing error or the like.

As shown in FIG. 1B, preferably the groove parts 32a, 32b are such that, at the portions of the groove parts 32a, 32b open to the exterior face 30 of the flange part 14b (or specifically on the top side of the grooves 32a, 32b), their width dimension in the direction parallel with the side face 20 of the flange part 14b is roughly constant, from one end to the other end, over the length direction vertical to the side face 20. This way, the region in which the thickness of the flange part 14b becomes thin can be kept small, while still ensuring the necessary and sufficient width needed to insert the end portions of the lead parts 44, 44b, and consequently drop in the strength of the flange part 14b can be prevented. It should be noted that "roughly constant" includes differences by manufacturing error or the like.

Preferably the width dimension of the recessed parts 34a, 34b in the direction vertical to the side faces 20, 22 of the flange part 14b is wider, from the viewpoint of collecting more residual flux 52; however, too wide a dimension shortens the length of the groove parts 32a, 32b and thereby causes the bonding strength of the lead parts 44a, 44b with the metal films 60a, 60b to drop. Accordingly, the width dimension of the recessed parts 34a, 34b in the direction vertical to the side face 20 of the flange part 14b is preferably 0.1 times or greater but no greater than 0.4 times, or more preferably 0.2 times or greater but no greater than 0.3 times, the width direction of the flange part 14b in the direction orthogonal to the side face 20 of the flange part 14b.

Example 2

Figure 7A:
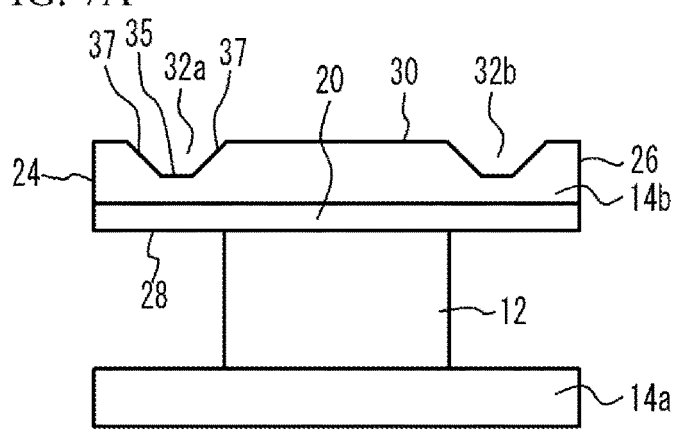
FIGS. 7A and 7B are drawings showing the drum core in Example 2.
Figure 7B:
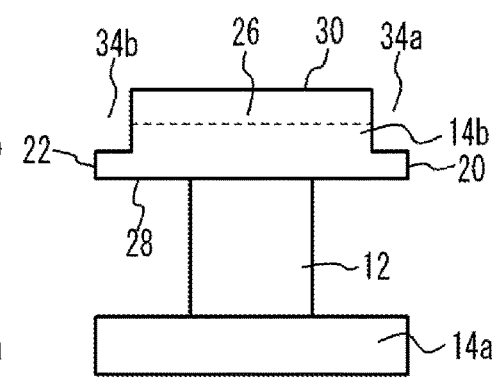

FIGS. 7A and 7B are drawings showing the drum core in Example 2. As shown in FIGS. 7A and 7B, the coil component in Example 2 is such that the depth dimension in the axial direction of the winding shaft 12, of the recessed parts 34a, 34b provided on the flange part 14b, is deeper than the depth dimension in the axial direction of the winding shaft 12, of the groove parts 32a, 32b provided on the flange part 14b. The remaining constitutions of the coil component in Example 2 are the same as those of the coil component in Example 1 and therefore not illustrated or explained.

According to Example 2, the depth dimension of the recessed part 34a in the axial direction of the winding shaft 12 is greater than the depth dimension of the groove parts 32a, 32b in the axial direction of the winding shaft 12. This increases the volume of the recessed part 34a, which allows for collection, in the recessed part 34a, of more residual flux 52 that has traveled along the lead parts 44a, 44b. Accordingly, attachment of residual flux 52 to the winding part 42 can be prevented further.

From the viewpoint of collecting more residual flux 52, the depth dimension of the recessed parts 34a, 34b in the axial direction of the winding shaft 12 is preferably 1.2 times or greater, or more preferably 1.5 times or greater, or yet more preferably 2.0 times or greater, the depth dimension of the groove parts 32a, 32b in the axial direction of the winding shaft 12. If the recessed parts 34a, 34b become too deep, on the other hand, the strength of the flange part 14b drops in the areas where the recessed parts 34a, 34b are provided. Accordingly, the depth dimension of the recessed parts 34a, 34b in the axial direction of the winding shaft 12 is preferably 0.6 times or smaller, or more preferably 0.5 times or smaller, or yet more preferably 0.4 times or smaller, the thickness of the flange part 14b.

Example 3

Figure 8A:
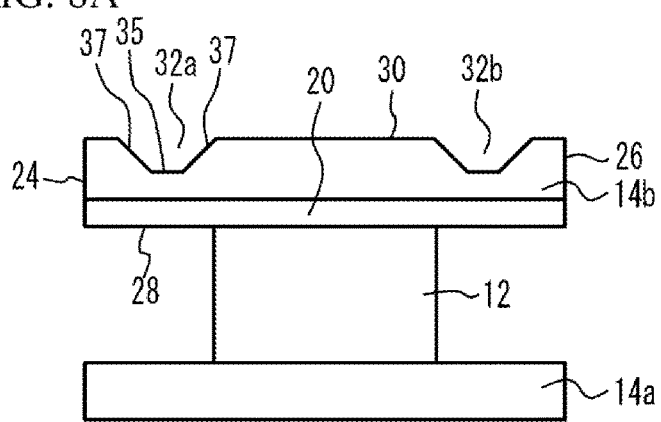
FIGS. 8A and 8B are drawings showing the drum core in Example 3.
Figure 8B:
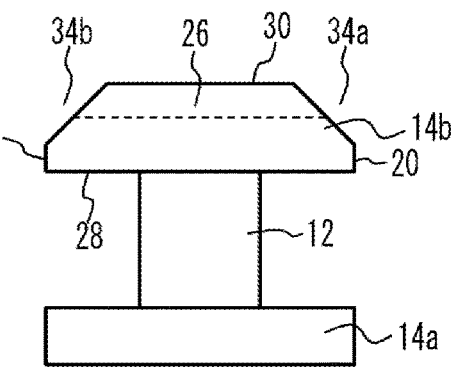

FIGS. 8A and 8B are drawings showing the drum core in Example 3. As shown in FIGS. 8A and 8B, the coil component in Example 3 is such that the side faces of the recessed parts 34a, 34b provided on the flange part 14b are beveled. In other words, the recessed parts 34a, 34b are shaped in a manner having a beveled face when viewed from the side faces 20, 22 of the flange part 14b. The depth dimension of the deepest portion of the recessed parts 34a, 34b in the axial direction of the winding shaft 12 is deeper than the depth dimension of the groove parts 32a, 32b in the axial direction of the winding shaft 12, for example; however, it may be roughly the same as the depth dimension of the groove parts 32a, 32b in the axial direction of the winding shaft 12. The remaining constitutions of the coil component in Example 3 are the same as those of the coil component in Example 1 and therefore not illustrated or explained.

According to Example 3, the recessed parts 34a, 34b are shaped in a manner having a beveled face when viewed from the side faces 20, 22 of the flange part 14b. This way, the volume of the recessed parts 34a, 34b can be increased, while still ensuring the thickness of the flange part 14b at the recessed parts 34a, 34b. As a result, residual flux 52 can be collected in the recessed parts 34a, 34b and thus attachment of residual flux 52 to the winding part 42 can be prevented, while preventing the strength of the flange part 14b from dropping.

Also, the beveled shape of the side face of the recessed part 34a makes it easy to lead out the conductive wire 46 to the exterior face 30 of the flange part 14b in the bending process.

Example 4

Figure 9A:
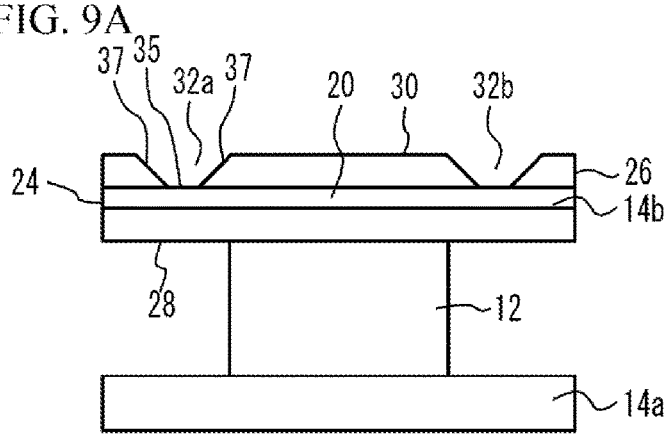
FIGS. 9A and 9B are drawings showing the drum core in Example 4.
Figure 9B:
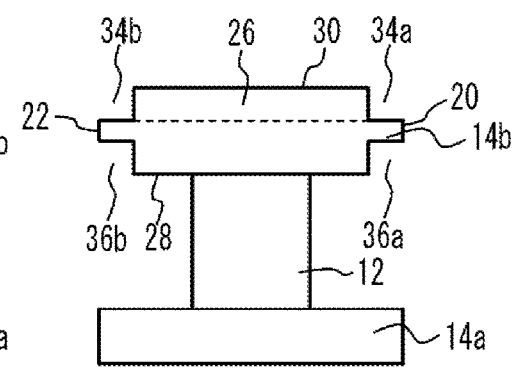

FIGS. 9A and 9B are drawings showing the drum core in Example 4. As shown in FIGS. 9A and 9B, the coil component in Example 4 is such that, in addition to the recessed parts 34a, 34b provided on the flange part 14b in the areas where the side faces 20, 22 and exterior face 30 are adjoined, recessed parts 36a, 36b are also provided in the areas where the side faces 20, 22 and interior face 28 are adjoined. In one example, the depth dimension of the recessed parts 36a, 36b in the axial direction of the winding shaft 12 is roughly the same as the depth dimension of the recessed parts 34a, 34b in the axial direction of the winding shaft 12; however, the two may also be different. In one example, the width of the recessed parts 36a, 36b in the direction vertical to the side faces 20, 22 of the flange part 14b is roughly the same as the width of the recessed parts 34a, 34b in the direction orthogonal to the side faces 20, 22 of the flange part 14b; however, the two may also be different. Just like the recessed parts 34a, 34b, the recessed parts 36a, 36b may also extend from one, to the other, of the pair of side faces 24, 26 of the flange part 14b, but they are at least provided in the areas where the lead parts 44a, 44b are led out. The remaining constitutions of the coil component in Example 4 are the same as those of the coil component in Example 1 and therefore not illustrated or explained.

According to Example 4, the side face 20 of the flange part 14b has a recessed part 36a in the area where the interior face 28 and side face 20 are adjoined and the lead parts 44a, 44b are led out. This way, any residual flux 52 that has traveled along the lead parts 44a, 44b can be collected in the recessed part 36a before reaching the winding part 42. As a result, attachment of residual flux 52 to the winding part 42 can be prevented further.

Both the recessed parts 34a, 34b and recessed parts 36a, 36b have a function to collect residual flux 52, but since the recessed parts 36a, 36b play supplementary roles, the depth dimension of the recessed parts 36a, 36b in the axial direction of the winding shaft 12 may be set shallower than the depth dimension of the recessed parts 34a, 34b in the axial direction of the winding shaft 12. This can prevent thinning of the flange part 14b in the areas where the recessed parts 34a, 34b and recessed parts 36a, 36b are provided, thus preventing the strength of the flange part 14b from dropping. Also, from the viewpoint of preventing the strength of the flange part 14b from dropping, the width dimension of the recessed parts 36a, 36b in the direction vertical to the side faces 20, 22 of the flange part 14b may be set smaller than the width dimension of the recessed parts 34a, 34b in the direction vertical to the side faces 20, 22 of the flange part 14b.

Example 5

Figure 10:
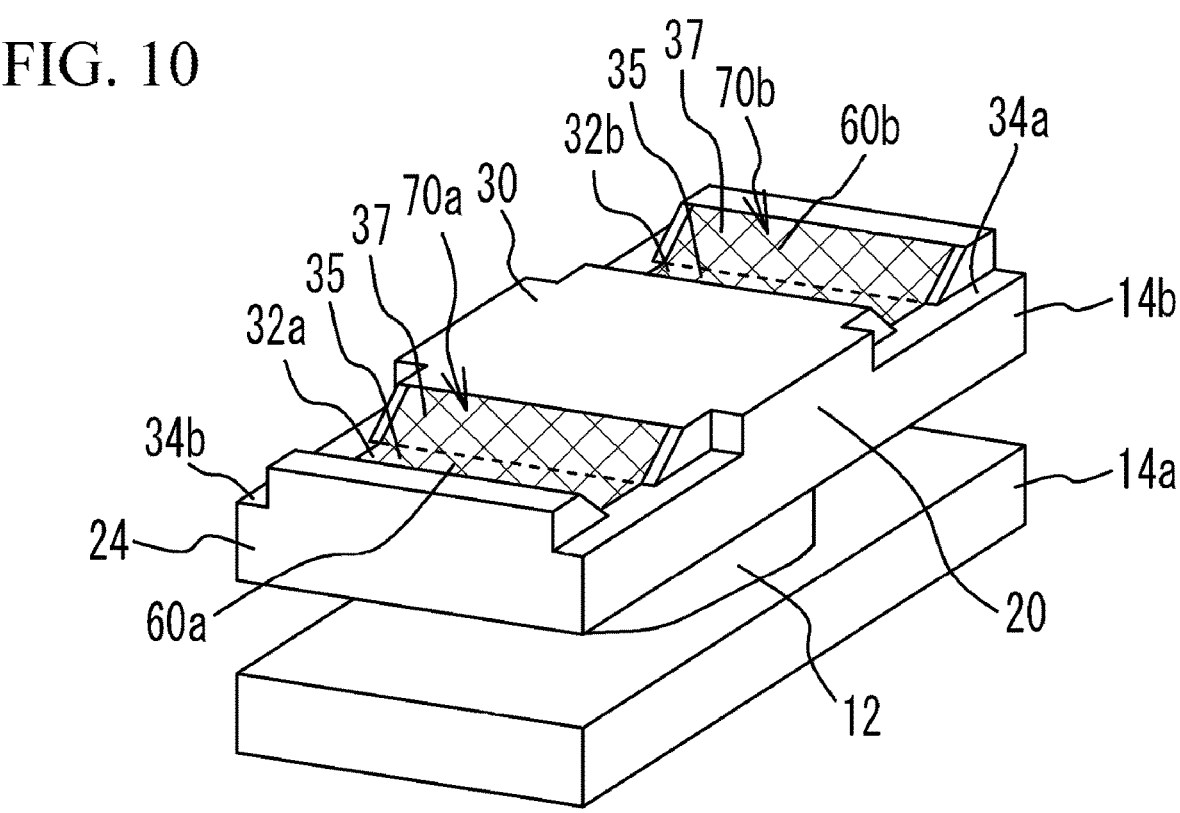
FIG. 10 is a perspective view of the drum core in Example 5.

FIG. 10 is a perspective view of the drum core in Example 5. It should be noted that, in FIG. 10, the terminal parts 70a, 70b whose regions are defined by the metal films 60a, 60b are also illustrated. As shown in FIG. 10, the recessed parts 34a, 34b may not extend from one, to the other, of the pair of side faces 24, 26 of the flange part 14b. In this case, too, attachment of residual flux 52 to the winding part 42 can be prevented for the same reasons illustrated by Example 1.

Example 6

Figure 11:
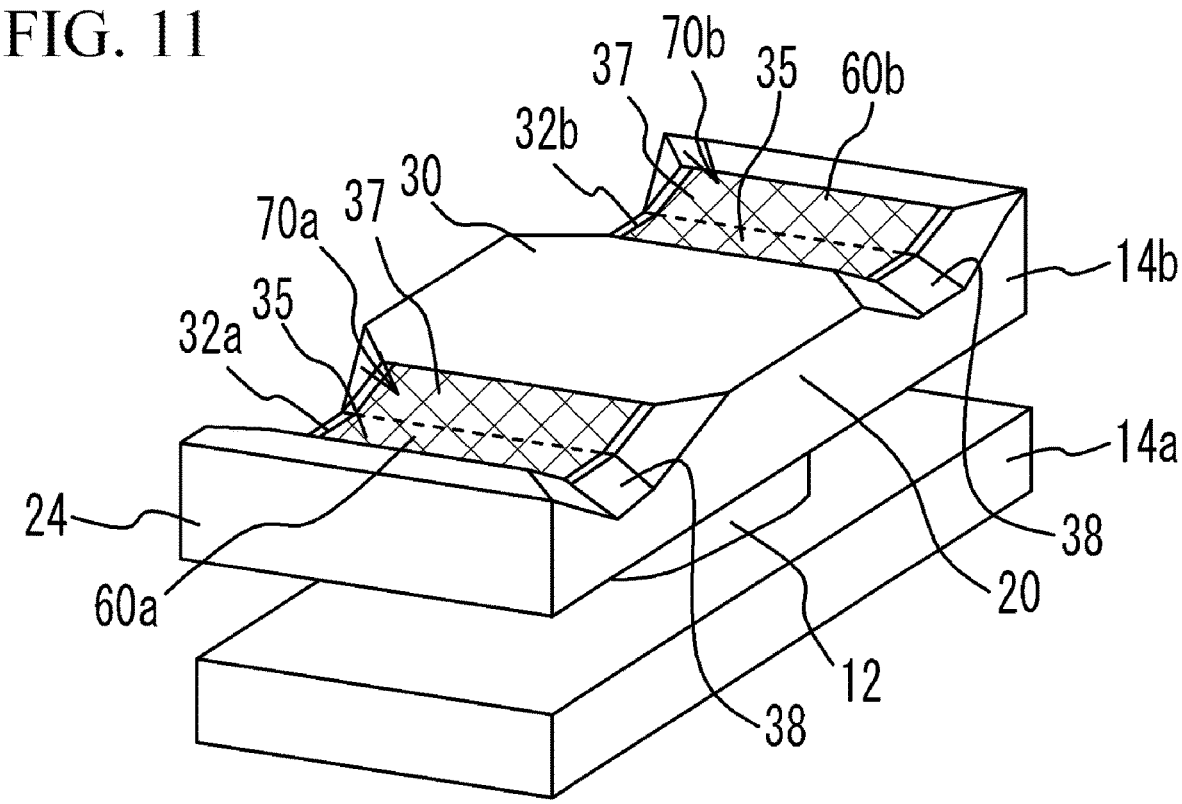
FIG. 11 is a perspective view of the drum core in Example 6.

FIG. 11 is a perspective view of the drum core in Example 6. It should be noted that, in FIG. 11, the terminal parts 70a, 70b whose regions are defined by the metal films 60a, 60b are also illustrated. As shown in FIG. 11, the coil component in Example 6 is such that recessed parts 38 are provided on the exterior face 30 sides of the side faces 20, 22 of the flange part 14b. The cross-section shape of a section, running parallel with the side face 20, of the recessed part 38 provided on the side face 20, where such section is farthest away from the side face 20 and defines the boundary with the groove part 32a or 32b in which the terminal part 70a or 70b is provided, is equal to the cross-section shape of a section, running parallel with the side face 20, of the groove part 32a or 32b in which the terminal part 70a or 70b is provided, where such section defines the boundary with the recessed part 38. The recessed part 38 provided on the side face 20 is formed to have a cross-section shape characterized in that, when the part is broken down into sections that are each running parallel with the side face 20, the area of the cross-section shape of each of these sections becomes larger as the distance between the side face 20 and each section becomes shorter, and that the plane formed by connecting these sections is beveled. Also, the recessed part 38 provided on the side face 20 is such that its plane formed by connecting the sections that are each parallel with the side face 20 is a beveled (or angled) plane continuing to the bottom face 35, and also to the beveled face 37, of the groove part 32a or 32b. It should be noted that, although the recessed part 38 provided on the side face 22 also has a shape similar to that of the recessed part 38 provided on the side face 20, it is not explained here.

The recessed part 38 is shaped in a manner having a plane that dips in a beveled/angled form from the bottom face 35 of the groove part 32a or 32b to which the terminal part 70a or 70b is contacted, toward the side face 20 or 22. Also, the recessed part 38 is shaped in a manner having a slope that spreads in a beveled/angled form from the beveled face 37 of the groove part 32a or 32b to which the terminal part 70a or 70b is contacted, toward the side face 20 or 22. The remaining constitutions of the coil component in Example 6 are the same as those of the coil component in Example 1 and therefore not illustrated or explained.

According to Example 6, the recessed part 38 provided on the side face 20 of the flange part 14b is such that the cross-section shape of its section running parallel with the side face 20, where such section is farthest away from the side face 20 and defines the boundary with the groove part 32a or 32b, is equal to the cross-section shape of a section, running parallel with the side face 20, of the groove part 32a or 32b, where such section defines the boundary with the recessed part 38. Also, the recessed part 38 is formed to have a cross-section shape characterized in that the area of the cross-section shape of each of its sections parallel with the side face 20 becomes larger as the distance between the side face 20 and each section becomes shorter, and that the plane formed by connecting these sections is beveled/angled. In this case, too, the distances between the terminal parts 70a, 70b and the winding part 42 of the coil part 40, via the lead parts 44a, 44b, can be increased, just like in Example 1. Additionally, this allows, in the event that residual flux 52 has traveled along the lead parts 44a, 44b, for collection of more residual flux 52 in the recessed part 38. Furthermore, the regions of the lead parts 44a, 44b where the insulating film 48 is stripped become smaller and the use quantity of flux 52 decreases as a result, which in turn reduces the very production of residual flux 52. Accordingly, any residual flux 52 that has attached to the conductive wire 46 and/or the interior of the groove parts 32a, 32b, can be prevented from traveling along the lead parts 44a, 44b and attaching to the winding part 42.

Example 7

Figure 12:
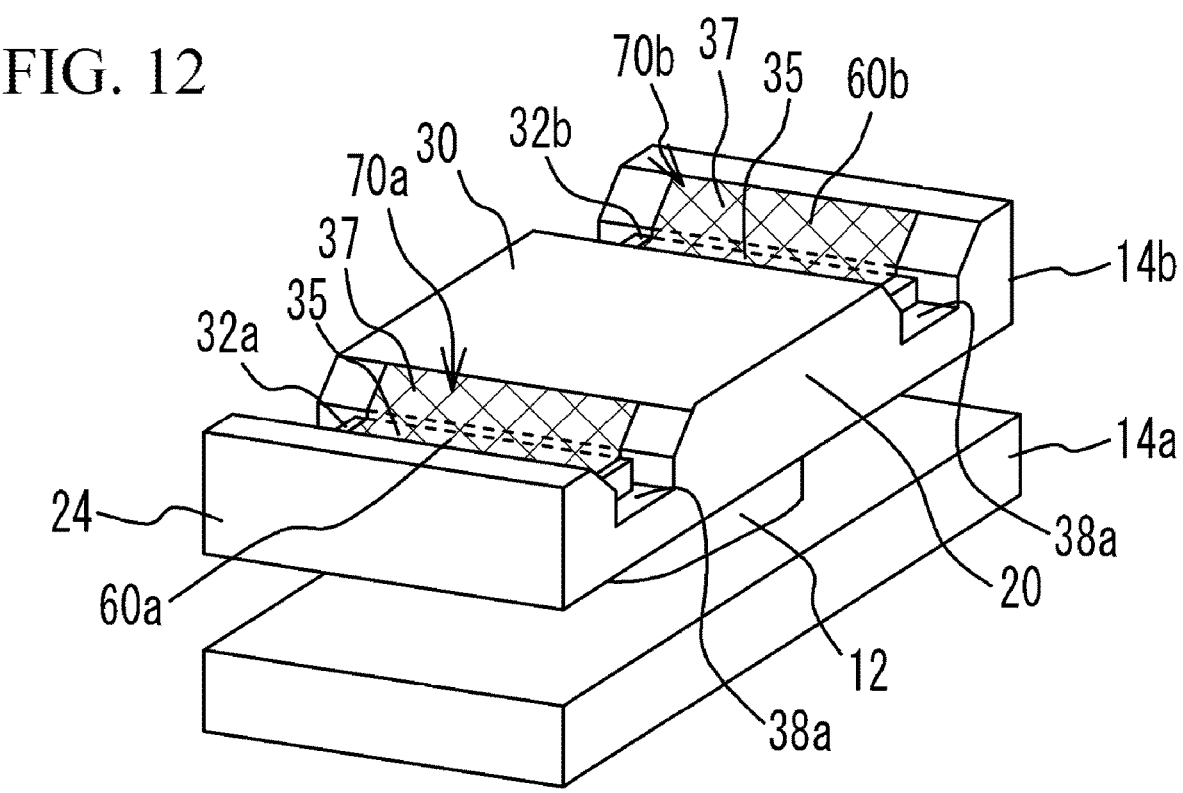
FIG. 12 is a perspective view of the drum core in Example 7.

FIG. 12 is a perspective view of the drum core in Example 7. It should be noted that, in FIG. 12, the terminal parts 70a, 70b whose regions are defined by the metal films 60a, 60b are also illustrated. As shown in FIG. 12, the coil component in Example 7 is such that the recessed part 38a is shaped in a manner having a face that dips stepwise from the bottom face 35 of the groove part 32a or 32b to which the terminal part 70a or 70b is contacted, toward the side face 20 or 22 of the flange part 14b. The remaining constitutions are the same as those in Example 6 and therefore not explained.

As in Example 6, the recessed part 38 may have such a shape that its plane formed by connecting the sections that are each parallel with the side face 20 is an angled plane continuing to the bottom face 35, and also to the beveled face 37, of the groove part 32a or 32b. As in Example 7, the recessed part 38a may be formed by causing the bottom face 35 of the groove part 32a or 32b to dip stepwise.

It should be noted that, in Examples 1 to 5, the portion of the recessed part 34a positioned between the bottom face 35 of the groove part 32a or 32b and the side face 20 of the flange part 14b may be depressed downward from the bottom face 35 of the groove part 32a or 32b, just like in Examples 6 and 7.

Example 8

Figure 13:
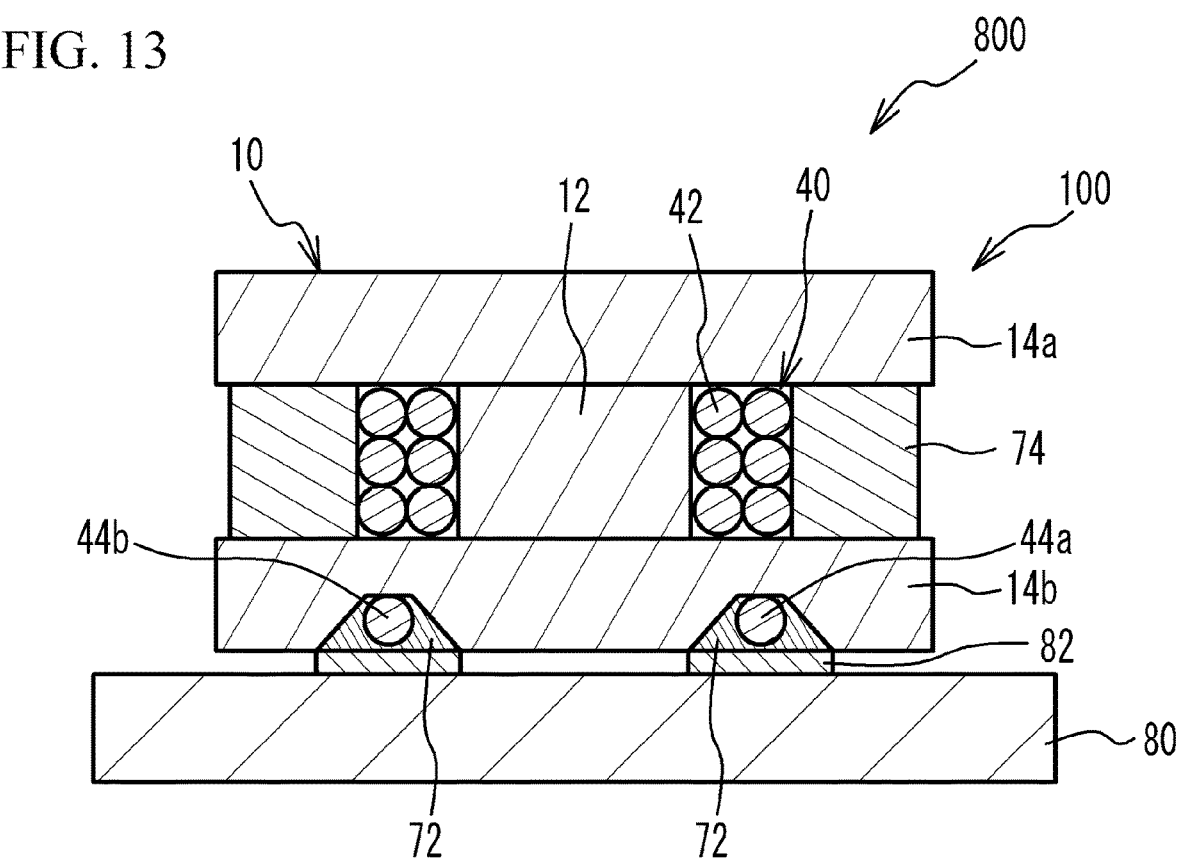
FIG. 13 is a cross-sectional view of the electronic device pertaining to Example 8.

FIG. 13 is a cross-sectional view of the electronic device pertaining to Example 8. As shown in FIG. 13, the electronic device 800 in Example 8 comprises a circuit board 80 and the coil component 100 in Example 1 that has been mounted on the circuit board 80. The coil component 100 is mounted on the circuit board 80 with the solder 72 joined to the electrodes 82 on the circuit board 80.

According to the electronic device 800 in Example 8, the coil component 100 in Example 1 is mounted on a circuit board 80. This way, an electronic device 800 having a coil component 100 resistant to drop in reliability can be obtained. It should be noted that, while Example 8 illustrated an example where the coil component 100 in Example 1 was mounted on a circuit board 80, any of the coil components in Examples 2 to 7 may be mounted instead.

The foregoing described the examples of the present invention in detail; however, the present invention is not limited to these specific examples and various modifications and changes may be added so long as doing so does not deviate from the key points of the present invention as described in "What Is Claimed Is."

We claim:
1. A coil component comprising:
a core part including:
a winding shaft; and
a flange part provided in a planar shape at an axial-direction end of the winding shaft, wherein the flange part has:

an exterior face on an opposite side of the winding shaft, a groove part provided on the exterior face, a first side face intersecting with a long axis of the groove part, and a first recessed part provided in the first side face, wherein the first side face has an upper portion positioned on a side of the exterior face and a lower portion positioned on a side of the winding shaft wherein the first recessed part is provided only in the upper portion, wherein the first recessed part is communicated with the groove part in a direction of the long axis and intervenes between the groove part and the first side face as viewed in an axial direction of the winding shaft, and an area of a cross section, taken in a direction parallel with the first side face, of the recessed part is greater than an area of a cross section, taken in a direction parallel with the first side face, of the groove part;

a coil part including:

a winding part constituted by winding a conductor having an insulating film; and a lead part, which is a portion of the conductor that has been led out from the winding part, along the first side face of the flange part, into the groove part of the flange part via the first recessed part; and a terminal part provided in the groove part of the flange part away from the first side face, which includes an end portion of the lead part where the insulating film has been stripped and a soldered portion covering the end portion.

2. The coil component according to claim 1, wherein the first recessed part is such that its maximum width dimension in a direction orthogonal to an axial direction of the winding shaft in a cross section parallel with the first side face is greater than a maximum width dimension of the groove part in the direction orthogonal to the axial direction in a cross section parallel with the first side face.

3. The coil component according to claim 2, wherein:
the flange part has a second side face and a third side face, both adjoining the first side face; and
the first recessed part is provided in a manner contacting the second side face and the third side face.

4. The coil component according to claim 2, wherein a maximum depth dimension of the first recessed part in the axial direction is greater than a depth dimension of the groove part in the axial direction.

5. The coil component according to claim 2, wherein the first recessed part is shaped in a manner having a beveled face when viewed from the first side face.

6. The coil component according to claim 1, wherein the groove part is such that, at an opening of the groove part on the exterior face, its width dimension in a direction parallel with the first side face is roughly constant, from one end to another end, over a length direction orthogonal to the first side face.

7. The coil component according to claim 1, wherein the first recessed part is formed in such a way that: a cross-section shape of its cross section, running parallel with the first side face, where said cross section is farthest away from the first side face and defines a boundary with the groove part, is equal to a cross-section shape of a cross section, running parallel with the first side face, of the groove part, where said cross section defines a boundary with the first recessed part; and an area of the cross-section shape of any other cross sections of the recessed part parallel with the first side face becomes larger as a distance between the first side face and each cross section becomes shorter in a manner forming a beveled plane by connecting these cross sections.

8. The coil component according to claim 7, wherein:
the groove part comprises a bottom face and two beveled faces adjoining the bottom face in a direction parallel with the first side face; and
the first recessed part is shaped in a manner that the beveled plane formed by connecting each of the other cross sections parallel with the first side face is a continuously beveled plane continuing to the bottom face, and to the two beveled faces, of the groove part.

9. The coil component according to claim 1, wherein:
the groove part comprises a bottom face and two beveled faces adjoining the bottom face in a direction parallel with the first side face; and
the first recessed part is formed as a downwardly depressed step continuously from the bottom face of the groove part.

10. The coil component according to claim 1, wherein the flange part has an interior face on the winding shaft side, and the first side face has a second recessed part in an area adjoining the first side face and where the lead part is led out.

11. The coil component according to claim 1, wherein:
the flange part has a fourth side face on an opposite side of the first side face, and another recessed part provided on the fourth side face, wherein the another recessed part is communicated with the groove part in a direction of the long axis and an area of a cross section, taken in a direction parallel with the fourth side face, of the another recessed part, is greater than an area of a cross section, taken in a direction parallel with the fourth side face, of the groove part contacting the terminal part.

12. The coil component according to claim 1, wherein:
the exterior face of the flange part has long sides and short sides; and
the first side face of the flange part is roughly parallel with the long sides.

13. An electronic device, comprising:
the coil component according to claim 1; and
a circuit board on which the coil component has been mounted.

14. The coil component according to claim 1, wherein the first side face is planar.

15. The coil component according to claim 1, wherein the first recessed part has a depth which is 10% to 40% of a length of the flange part in a direction parallel to the long axis of the groove part.

16. The coil component according to claim 10, wherein the second recessed part is provided only in the lower portion of the first side face.

* * * * *